US011528427B2

(12) United States Patent
Ji et al.

(10) Patent No.: US 11,528,427 B2
(45) Date of Patent: Dec. 13, 2022

(54) SHAPE AND REFLECTANCE RECONSTRUCTION

(71) Applicant: JJK Holdings, LLC, Baton Rouge, LA (US)

(72) Inventors: Yu Ji, Baton Rouge, LA (US); Mingyuan Zhou, Baton Rouge, LA (US); Jingyi Yu, Baton Rouge, LA (US)

(73) Assignee: JK HOLDINGS, LLC.

( * ) Notice: Subject to any disclaimer, the term of this patent is extended or adjusted under 35 U.S.C. 154(b) by 6 days.

(21) Appl. No.: 17/129,930

(22) Filed: Dec. 22, 2020

(65) Prior Publication Data

US 2022/0174224 A1 Jun. 2, 2022

Related U.S. Application Data

(60) Provisional application No. 63/118,741, filed on Nov. 27, 2020.

(51) Int. Cl.
*H04N 5/247* (2006.01)
*G06T 7/557* (2017.01)
*H04N 5/225* (2006.01)

(52) U.S. Cl.
CPC ............ *H04N 5/247* (2013.01); *G06T 7/557* (2017.01); *H04N 5/2256* (2013.01); *G06T 2207/10052* (2013.01)

(58) Field of Classification Search
CPC ....... H04N 5/247; H04N 5/2256; G06T 7/557
See application file for complete search history.

(56) References Cited

U.S. PATENT DOCUMENTS

| 9,058,765 | B1 * | 6/2015 | Mallick | G06Q 40/04 |
| 10,529,087 | B1 * | 1/2020 | Dellaert | G03B 35/08 |
| 10,740,884 | B2 * | 8/2020 | McCall | H04N 5/2256 |
| 2019/0052792 | A1 * | 2/2019 | Baba | H04N 13/327 |
| 2020/0113424 | A1 * | 4/2020 | Griffin | G02B 19/0028 |
| 2021/0227105 | A1 * | 7/2021 | Davenel | H04N 5/247 |

OTHER PUBLICATIONS

Non-Lambertian Surface Shape and Reflectance Reconstruction Using Concentric Multi-Spectral Light Field; Zhou et al.; published Apr. 19, 2019; retrieved from the internet Feb. 11, 2022 (Year: 2019).*

* cited by examiner

*Primary Examiner* — Jonathan R Messmore
(74) *Attorney, Agent, or Firm* — Kilpatrick Townsend & Stockton LLP

(57) ABSTRACT

An image capturing system includes a center point location, and a circular light source ring centered on the center point location. Light sources are on the circular light source ring, and each emit light in one of a number of spectral bandwidths. The image capturing system also includes circular camera rings, where each circular camera ring is centered on the center point location, where each circular camera ring includes camera locations which are equally spaced apart. The image capturing system also includes one or more cameras configured to capture images of an object from each of the camera locations of each particular circular camera ring, where the images captured from the camera locations of each particular circular camera ring are captured in one of the different spectral bandwidths, and where the object is illuminated by the light sources of the light source ring while each of the images are captured.

14 Claims, 9 Drawing Sheets

MSS-Cam ($M_X$)
at incorrect depth

MSS-Cam ($M_X$)
at more correct depth

SHAPE AND REFLECTANCE RECONSTRUCTION

CROSS-REFERENCES TO RELATED APPLICATIONS

This application claims the benefit of U.S. Provisional application No. 63/118,741, filed Nov. 27, 2020, titled "SHAPE AND REFLECTANCE RECONSTRUCTION," the disclosure of which is incorporated herein by reference.

TECHNICAL FIELD

The subject matter described herein relates to shape and reflectance reconstruction of an object using image information of the object, and more particularly to shape and reflectance reconstruction of objects having non-Lambertian surfaces.

BACKGROUND

Recovering the shape and reflectance information of non-Lambertian surfaces remains a challenging problem in computer vision since the view-dependent appearance invalidates traditional photo-consistency constraint. Improved systems and techniques for determining shape and reflectance information non-Lambertian surfaces is needed in the art.

SUMMARY

A novel concentric multi-spectral light field (CMSLF) design that is able to recover the shape and reflectance of surfaces with arbitrary Lambertian or non-Lambertian material is discussed. The CMSLF system includes an array of cameras arranged on concentric circles where each circle of cameras captures a specific light spectrum. Coupled with a multi-spectral circle light, viewpoint and lighting variations may be sampled via spectral multiplexing, for example, one or more images taken at one or more image capture times. The concentric camera and light source setting may result in a unique single-peak pattern in specularity variation across viewpoints.

One inventive aspect is a concentric multi-spectral light field (CMSLF) image capturing system. The image capturing system includes a center point location, and a circular light source ring, where the circular light source ring is centered on the center point location. A plurality of light sources are each placed on the circular light source ring, the light sources are equally spaced apart, and each of the light sources is configured to emit light in one of a plurality of different spectral bandwidths. The image capturing system also includes a plurality of circular camera rings, where each circular camera ring is centered on the center point location, where each circular camera ring includes a plurality of camera locations, and where the camera locations of each circular camera ring are equally spaced apart. The image capturing system also includes one or more cameras configured to capture images of an object from each of the camera locations of each particular circular camera ring, where the images captured from the camera locations of each particular circular camera ring are captured in one of the different spectral bandwidths, and where the object is illuminated by the light sources of the light source ring while each of the images are captured.

In some embodiments, the camera locations of the circular camera rings are radially aligned.

In some embodiments, the quantity of circular camera rings is equal to the number of different spectral bandwidths.

In some embodiments, the quantity of light sources is equal to the number of different spectral bandwidths.

In some embodiments, the quantity of circular camera rings is equal to the number of different spectral bandwidths, and the quantity of light sources is equal to the number of different spectral bandwidths.

In some embodiments, the quantity of circular camera rings is equal to the number of different spectral bandwidths, the quantity of light sources is equal to the number of different spectral bandwidths, and the quantity of camera locations of each circular camera ring is equal to the number of different spectral bandwidths.

In some embodiments, the camera locations of the circular camera rings are radially aligned, and where the light sources are radially aligned with the camera locations of the circular camera rings.

In some embodiments, the CMSLF image capturing system also includes a processor configured to receive image data representing the captured images from the one or more cameras and to generate shape and reflectance maps of the object based on the received image data.

In some embodiments, generating the shape and reflectance maps of the object includes generating a Multi-spectral Surface Camera Representation (MSS-Cam) for each of a plurality of points of the object.

In some embodiments, generating the shape and reflectance maps of the object includes estimating a depth for each point of the object.

In some embodiments, generating the shape and reflectance maps of the object includes determining whether each point of the object is Lambertian.

In some embodiments, generating the shape and reflectance maps of the object includes subtracting a specular component from the MSS-Cams of non-Lambertian points to generate a specular-free MSS-Cam for each non-Lambertian point.

In some embodiments, generating the shape and reflectance maps of the object includes calculating a depth for each non-Lambertian point based on the specular-free MSS-Cam of each non-Lambertian point.

In some embodiments, generating the shape and reflectance maps of the object includes generating updated specular-free MSS-Cams for each non-Lambertian point based on the calculated depth for each non-Lambertian point.

Another inventive aspect is a method of generating shape and reflectance maps of an object. The method includes illuminating the object with a circular light source ring, where the circular light source ring is centered on a center point location, where a plurality of light sources are each placed on the circular light source ring, where the light sources are equally spaced apart, and where each of the light sources is configured to emit light in one of a plurality of different spectral bandwidths. The method also includes capturing images of the object with one or more cameras from each of a plurality of camera locations, where the camera locations are each on one of a plurality of circular camera rings, where each circular camera ring is centered on the center point location, and where the images captured from the camera locations of each particular circular camera ring are captured in one of the different spectral bandwidths. The method also includes receiving image data representing the captured images from one or more cameras, generating the shape and reflectance maps of the object based on the received image data.

In some embodiments, generating the shape and reflectance maps of the object includes generating Multi-spectral Surface Camera Representation (MSS-Cam) for each of a plurality of points of the object based on the received image data, and estimating a depth for each point of the object.

In some embodiments, generating the shape and reflectance maps of the object includes determining whether each point of the object is Lambertian.

In some embodiments, generating the shape and reflectance maps of the object includes subtracting a specular component from the MSS-Cams of non-Lambertian points to generate a specular-free MSS-Cam for each non-Lambertian point.

In some embodiments, generating the shape and reflectance maps of the object includes calculating a depth for each non-Lambertian point based on the specular-free MSS-Cam of each non-Lambertian point.

In some embodiments, generating the shape and reflectance maps of the object includes generating updated specular-free MSS-Cams for each non-Lambertian point based on the calculated depth for each non-Lambertian point.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Particular embodiments of the invention are illustrated herein in conjunction with the drawings. Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

The figures illustrate various aspects of certain embodiments of concentric multi-spectral light field image capturing systems and how the systems or images from the systems can be used for generating shape and reflectance maps of objects imaged with the systems.

Figure 1:
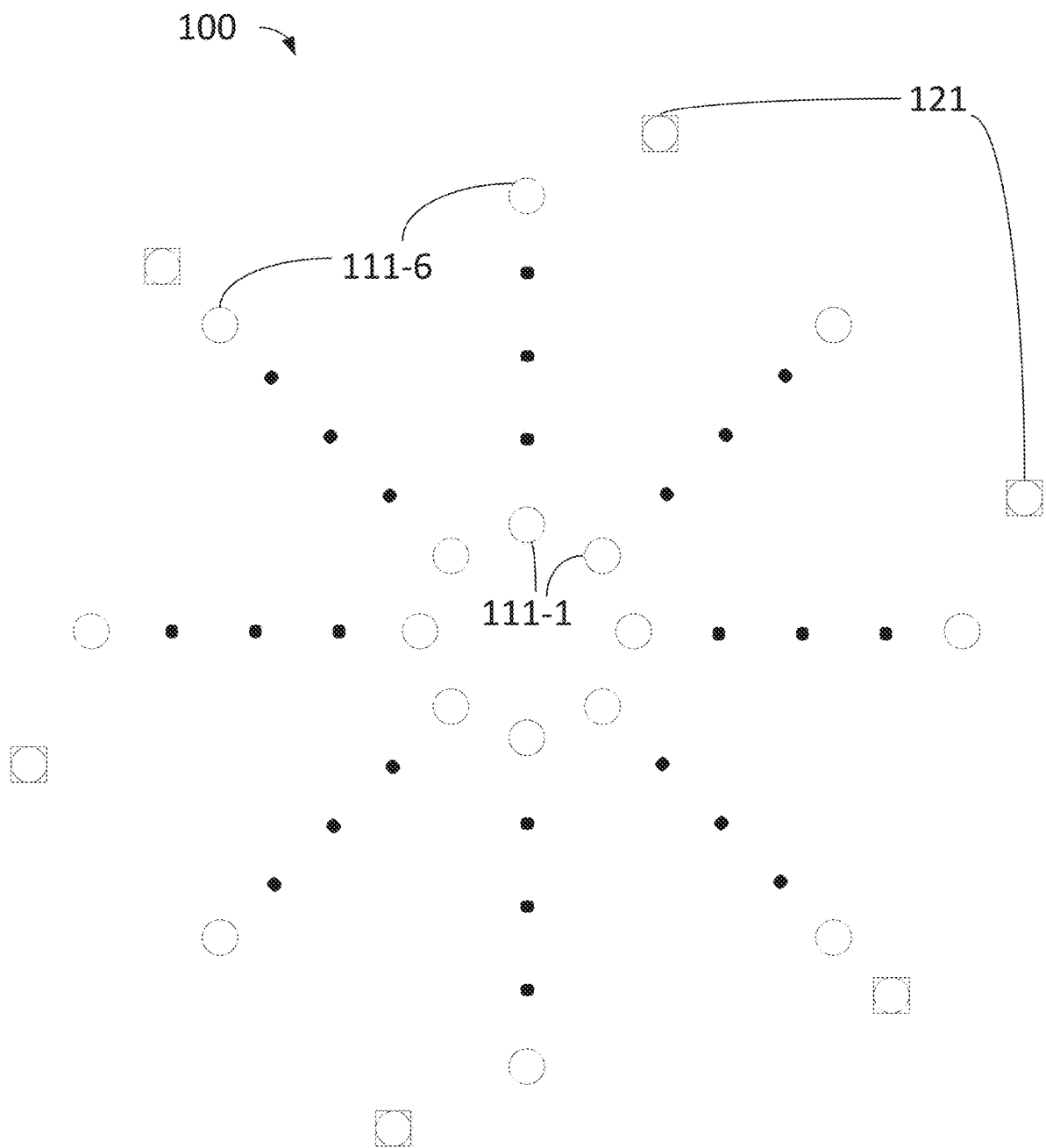
FIG. 1 illustrates a schematic diagram of a concentric multi-spectral light field (CMSLF) image capturing system.

FIG. 1 illustrates a schematic diagram of a concentric multi-spectral light field (CMSLF) image capturing system 100. CMSLF image capturing system 100 includes spectral cameras 111-1-111-6. Additionally, CMSLF image capturing system 100 includes multi-spectral light sources 121.

As shown in FIG. 1, in the illustrated embodiment, the spectral cameras 111-1-111-6 are arranged on coplanar and concentric circles. Alternative arrangements may be used. In this embodiment, each circle of spectral cameras 111-1-111-6 has an identical number of spectral cameras that are uniformly spaced. The spectral cameras 111-1-111-6 of each particular circle are configured to capture a same or similar image spectrum or bandwidth specific to the particular circle. For example, the spectral cameras of spectral cameras 111-1 may be configured to capture a blue spectrum or bandwidth, and the spectral cameras of spectral cameras 111-2 may be configured to capture a red spectrum or bandwidth, where each circle of spectral cameras 111-1-111-6 is configured to capture a different spectrum or bandwidth.

Each of the spectral cameras 111-1-111-6 is or is configured to be electronically connected with a processor (not shown), and is configured to electronically transmit captured image data of an object to the processor. In addition, the processor is configured to generate shape and reflectance maps of the object according to processing principles discussed elsewhere herein.

In the illustrated embodiment, each circle of spectral cameras 111-1-111-6 includes eight cameras. In alternative embodiments, a different number of cameras is used for each circle of spectral cameras 111-1-111-6.

In addition, in the illustrated embodiment, CMSLF image capturing system 100 includes six circles of spectral cameras 111-1-111-6. In alternative embodiments, a different number of circles of spectral cameras 111-1-111-6 is used.

Furthermore, in the illustrated embodiment, the cameras of the circles are radially aligned. Alternative arrangements may be used.

In some embodiments, two or more of the spectral cameras 111-1-111-6 are implemented using a single camera, which is movable with respect to the multi-spectral light sources 121 and the object being modeled. For example, a single camera may be used to capture images from any one or more of the positions of the spectral cameras 111-1-111-6. In some embodiments, all of the spectral cameras 111-1-111-6 are implemented using a single camera, which is movable with respect to the multi-spectral light sources 121 and the object being modeled. For example, a single camera may be used to capture images from the all the positions of the spectral cameras 111-1-111-6. Accordingly, references to multiple spectral cameras include a single camera implementation of the multiple spectral cameras.

As shown in FIG. 1, in the illustrated embodiment, the multi-spectral light sources 121 are arranged on a light source circle which is coplanar and concentric with the circles of the spectral cameras 111-1-111-6. Alternative arrangements may be used. The surrounding multi-spectral light sources 121 are configured to provide direction-varying illumination for each camera circle.

In the illustrated embodiment, six multi-spectral light sources 121 are used. In alternative embodiments, a different number of multi-spectral light sources 121 cameras are used.

In some embodiments, the number of multi-spectral light sources 121 is equal to the number of circles of spectral cameras.

Furthermore, in some embodiments, the multi-spectral light sources 121 are radially aligned with the cameras of the circles of spectral cameras. Alternative arrangements may be used.

In some embodiments, narrowband spectral filters may be used for both the spectral cameras 111-1-111-6 and for the multi-spectral light sources 121. Accordingly, the cameras of a single circle may be equipped with a narrowband spectral filter corresponding with a particular color or bandwidth, and one of the light sources of multi-spectral light sources 121 may be equipped with a narrowband spectral filter corresponding with the same particular color or bandwidth. Additionally, the cameras of each single circle may be equipped with a narrowband spectral filter corresponding with a particular color or bandwidth, such that the cameras of each single circle are configured to capture images in the particular color or bandwidth. In addition, one of the light sources of multi-spectral light sources 121 may be equipped with a narrowband spectral filter corresponding with the same particular color or bandwidth, such that the one light source emits light in the same particular color or bandwidth. Accordingly, in some embodiments, each of the multi-spectral light sources 121 is equipped with a narrowband spectral filter corresponding with the same color or bandwidth as the narrowband spectral filters with which the spectral cameras 111-1-111-6 of one circle are also equipped. In some embodiments, the spectral cameras 111-1-111-6 of one circle are equipped with a narrowband spectral filters corresponding with the same color or bandwidth as the narrowband spectral filter with which one of the multi-spectral light sources 121 is also equipped.

As a result, the CMSLF image capturing system 100 may be configured to simultaneously sample multiple viewpoints under varying lighting directions without interference via spectral multiplexing.

To parameterize the CMSLF image capturing system 100, a classical two-plane parametrization (2PP) light field representation may be used. Because the multi-spectral cameras 111-1-111-6 are on coplanar circles, the center-of-projection (CoP) plane may be used as the st plane at z=0 and the image plane may be used as the uv plane at z=1. In addition, an st coordinate system may be used to index locations of the multi spectral cameras 111-1-111-6, and a uv coordinate system may be used to index pixel locations in the images captured by the spectral cameras 111-1-111-6.

For example, in an embodiment of CMSLF image capturing system 100 having m concentric camera circles and n multi-spectral cameras on each circle, the camera position on the st plane can be written as $(s(i,j),t(i,j))=(r_j \cos \varphi_i, r_j \sin \varphi_i)$, where $i \in \{1, \ldots, n\}$ is the multi-spectral camera index in each concentric circle; $j \in \{1, \ldots, m\}$ is the circle index, where m is the total number of spectral colors or bandwidths; $r_j$ is the radius of the jth camera circle; $\varphi_i=(i-1)\varphi\tilde{}$ is the spanned angle between the ith camera spoke and the x-axis, where $\varphi\tilde{}=2\pi/n$ is the interval angle between neighboring camera spokes. The jth camera circle captures wavelength or bandwidth λ.

In the illustrated embodiment, the number of multi-spectral light sources 121 is equal to the number of camera circles (=m). In embodiments where the multi-spectral light sources 121 are on a circle with radius $r_1$, the position of the jth multi-spectral light source in 3D can be written as $P_j=[r_1 \cos \theta_j, r_1 \sin \theta_j, 0]$ where $\theta_j=\theta_1+(j-1)\theta\tilde{}$, where $\theta_1$ is the angular position of the first light source and $\theta\tilde{}=2\pi/m$ is the angular interval between neighboring multi-spectral light sources.

The vector $P=[P_1; \ldots; P_m]$ may be used to represent the set of all spectral lighting positions. Because the spectral filters used on the light sources are the same as the cameras, the spectral illumination emitted from the jth light source 121 can only be received by the multi-spectral cameras of the jth camera circle.

Figure 2:
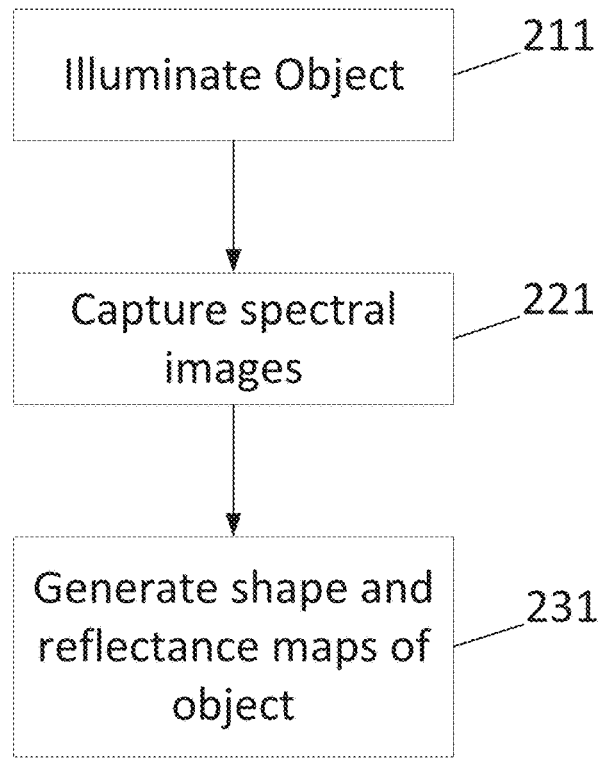
FIG. 2 is a flowchart diagram illustrating a method of generating shape and reflectance maps of an object using the CMSLF image capturing system of FIG. 1.

FIG. 2 is a flowchart diagram illustrating a method 200 of generating shape and reflectance maps of an object using an embodiment of the CMSLF image capturing system 100.

At 211, the object is illuminated using multi-spectral light sources 121. Accordingly, the object receives light of a particular spectrum or bandwidth from each of the multi-spectral light sources 121, and is illuminated thereby.

At 221, images of the object are captured by the spectral cameras. Accordingly, n images of the object at one of m spectral bandwidths are captured for each of them camera circles.

At 231, the image data captured by the spectral cameras is provided to a processor. In addition, the processor uses the image data to electronically generate shape and reflectance maps of the object. For example, the processor may process the captured image data according to principles discussed herein to generate the shape and reflectance maps of the object. In some embodiments, the processor further stores the generated electronic shape and reflectance map information in a memory. In some embodiments, the processor is configured to cause a graphical representation of the shape and reflectance maps to be rendered, for example on an electronic graphical display.

Figure 3:
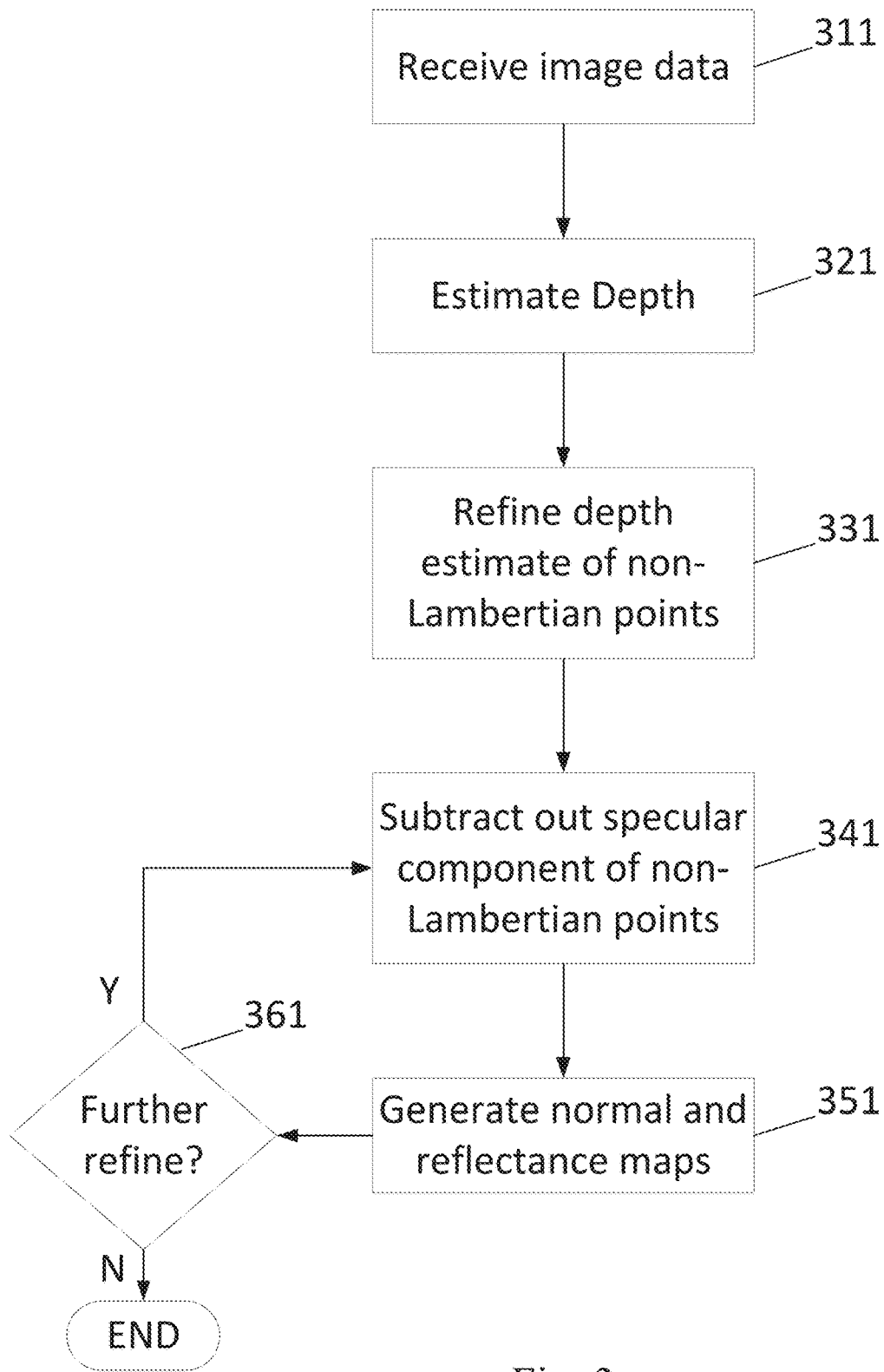
FIG. 3 is a flowchart diagram illustrating a method of generating shape and reflectance maps of an object using image data captured by an embodiment of the CMSLF image capturing system of FIG. 1.

FIG. 3 is a flowchart diagram illustrating a method 300 of generating shape and reflectance maps of an object using image data captured by an embodiment of the CMSLF image capturing system 100. The method 300 may be performed by a processor configured to receive the captured image data, for example, from spectral cameras of the CMSLF image capturing system 100.

At 311, the processor receives the captured image data. In some embodiments, the spectral cameras of the CMSLF image capturing system 100 are configured to store captured image data locally, and, at a later time provide the captured image data to the processor. In some embodiments, the spectral cameras of the CMSLF image capturing system 100 immediately or substantially immediately provide the captured image data to the processor.

At 321, the processor generates an initial estimate of a depth for each pixel and its corresponding 3D point based on MSS-Cams (Multi-spectral Surface Camera Representation) generated by processing the received image data. One or more examples of initial depth estimation is discussed elsewhere herein. In addition, one or more examples of MSS-Cam generation is discussed elsewhere herein.

At 331, the processor refines or replaces the depth estimation of the points identified as being non-Lambertian. One or more examples of how points are identified as being non-Lambertian is discussed elsewhere herein. In addition, one or more examples of how the processor refines a replaces the depth estimation is discussed elsewhere herein.

At 341, for non-Lambertian points, specular-free MSS-Cams are generated by subtracting a specular component from the MSS-Cams of the non-Lambertian points. One or more examples of how the processor generates the specular-free MSS-Cams is discussed elsewhere herein.

At 351, the processor applies a multi-spectral photometric stereo operation to the specular-free MSS-Cams to generate shape and reflectance map information of the imaged object. One or more examples of how the processor may apply the multi-spectral photometric stereo operation to the specular-free MSS-Cams is discussed elsewhere herein.

In some embodiments, the processor further stores the generated shape and reflectance map information in a memory. In some embodiments, the processor is configured to cause a graphical representation of the shape and reflectance maps to be rendered, for example on an electronic graphical display.

At 361, the processor determines whether to refine the generated shape and reflectance map information. For example, in some embodiments, the processor may determine a difference between the generated shape and reflectance map information and previously generated shape and reflectance map information, as understood by those of skill in the art. The processor may determine to refine the generated shape and reflectance map information in response to the difference being greater than a threshold, or may determine to not refine the generated shape and reflectance map information in response to the difference being less than a threshold, as understood by those of skill in the art.

In some embodiments, the processor may maintain a count of the number of times the shape and reflectance map information has been generated or refined. The processor may determine to refine the generated shape and reflectance map information in response to the count being less than a threshold, or may determine do not refine the generated shape and reflectance map information in response to the count being greater than a threshold.

If the processor determines to refine the generated shape and reflectance map information, the method returns to 341 where updated specular-free MSS-Cams are generated based on updated MSS-Cams. One or more examples of how to generate the updated MSS-Cams is discussed elsewhere herein.

If the processor determines to not refine the generated shape and reflectance map information, the method ends. In some embodiments, the processor further stores the generated shape and reflectance map information in a memory. In some embodiments, the processor is configured to cause a graphical representation of the shape and reflectance maps to be rendered, for example on an electronic graphical display.

CMSLF Reflectance Model

The processor generates a physics-based reflectance model using surface camera (S-Cam) representation of the imaged object. The S-Cam representation may be generated according to principles understood by those of skill in the art. For example, the S-Cam representation may be generated and used according to principles found in J. Yu, L. McMillan, and S. Gortler, "Scam light field rendering," in Computer Graphics and Applications, 2002. Proceedings. 10th Pacific Conference on. IEEE, 2002, pp. 137-144, which is incorporated herein by reference.

Dichromatic Phong Model

A Dichromatic Reflectance Model (DRM) may be used to model reflectance. The DRM may be generated and used according to principles found in S. A. Shafer, "Using color to separate reflection components," Color Research & Application, vol. 10, no. 4, pp. 210-218, 1985, which is incorporated herein by reference.

As understood by those of skill in the art, the DRM separates the surface reflectance into body reflectance and interface reflectance, both terms account for geometry and color. DRM is suitable for modeling inhomogeneous materials.

Given a light source with the spectral distribution $E(\lambda)$, where $\lambda$ refers to the wavelength, and a camera with spectral response function $Q(\lambda)$, the observed image intensity I under DRM at pixel p can be formulated as:

$$I(p) = w_d(p) \int_{\lambda_1}^{\lambda_N} R(p,\lambda) E(p,\lambda) Q(\lambda) d\lambda + w_s(p) \int_{\lambda_1}^{\lambda_N} E(p,\lambda) Q(\lambda) d\lambda \quad (1)$$

where $[\lambda 1, \lambda N]$ is the range of sampled wavelengths; $R(p, \lambda)$ is the surface reflectance; $w_d(p)$ and $w_s(p)$ are geometry-related scale factors. The first term in Eq. 1 represents body reflectance that models light reflection after interacting with the surface reflectance. The second term represents interface reflectance that models light immediately reflected from the surface and thus causing specularities.

Numerical integration with step $\lambda^\sim$ is applied on Eqn. 1, which, after dropping pixel p, becomes:

$$I = w_d REQ + w_s JEQ \quad (2)$$

where J is a row vector with all ones, $R=[R(\lambda_1), R(\lambda_1+\lambda^\sim), \ldots, R(\lambda_N)]$, $E=\text{diag}(E(\lambda_1), E(\lambda_1+\lambda^\sim), \ldots, E(\lambda_N))$ which is a diagonal matrix, and $Q=[Q(\lambda_1)\ Q(\lambda_1+\lambda^\sim), \ldots, Q(\lambda_N)]^T$.

To take the scene geometry into consideration, the Phong dichromatic model is formulated. The Phong dichromatic model combines the classical Phong model with the DRM and assumes the near point lighting (NPL), as understood by those of skill in the art. Specifically, the diffuse and specular factors $w_d$ and $w_s$ are modeled with lighting position, viewing direction, surface normal and roughness. The image intensity I can then be written as:

$$I = k_d \left( \frac{L \cdot N}{\|P - X\|^2} \right) REQ + k_s \left( \frac{(D \cdot V)^\alpha}{\|P - X\|^2} \right) JEQ \quad (3)$$

where N is the surface normal at a 3D point X; P is the position of light source; $L=(P-X)/\|P-X\|$ is the normalized lighting direction; V is the viewing direction; $D=2(L \cdot N)N-L$ is the reflection direction; a is the shininess parameter that models the surface roughness; and $k_d$ and $k_s$ refer to the diffuse and specular surface reflectivity.

Multi-Spectral Surface Camera (MSS-Cam)

The Phong dichromatic reflectance model is used to generate intensity information based on the image data captured with the CMSLF image capturing system 100. The S-Cam representation characterizes the angular sampling characteristics of a light field. Given a 3D scene point, its S-Cam representation can be synthesized by tracing rays originated from the scene point into the light field to fetch color, as illustrated in FIG. 4, which illustrates an embodiment of image capturing system 100 having red, yellow, and green spectral cameras.

A multi-spectral S-Cam representation (MSS-Cam) is generated using the dichromatic Phong model. Given a pixel (u, v) in the center camera view with position (s, t)=(0, 0), and assuming its corresponding 3D scene point is X(u,v,z)=(x,y,z), its MSS-Cam MX may be synthesized from the captured multi-spectral light field images of CMSLF image capturing system 100.

Figure 4:
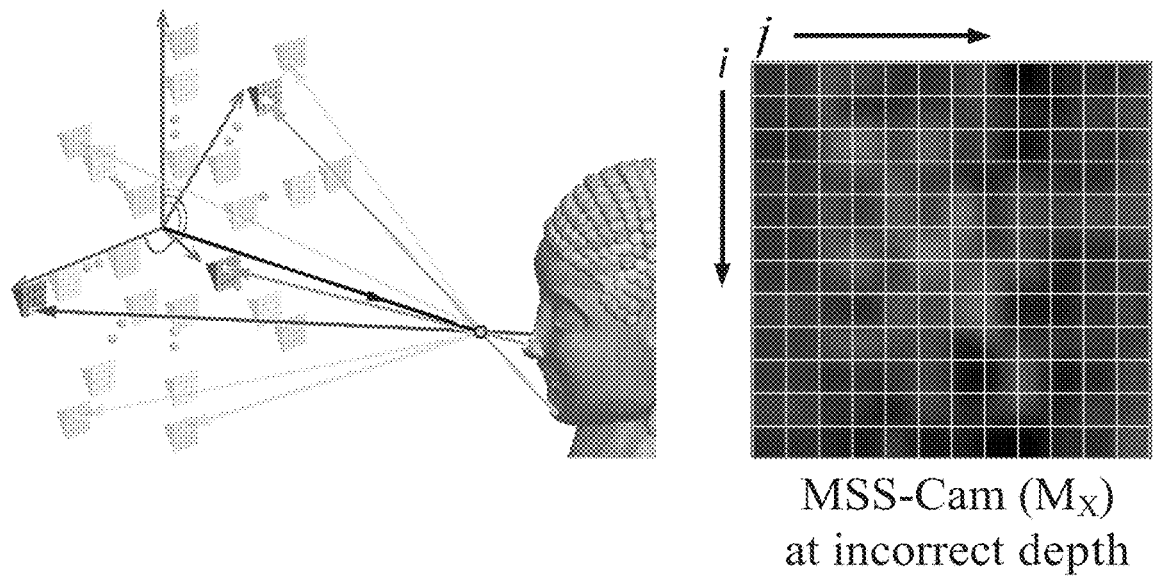
FIG. 4 illustrates an embodiment of image capturing system having red, yellow, and green spectral cameras, and also illustrates MSS-Cams for an incorrect depth and for a correct or more correct depth.
Figure 4:
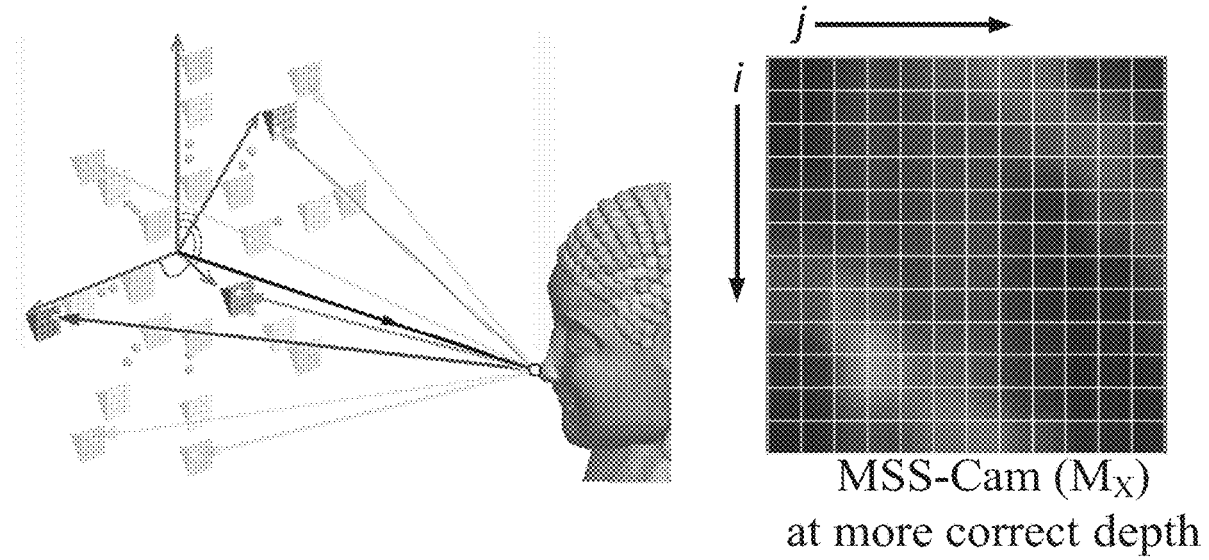

FIG. 4 also illustrates an MSS-Cam MX for an incorrect depth and for a correct or more correct depth.

The pixels in a column of MX are generated from data from cameras on the same ring that is sampled under a specific spectrum according to the concentric camera/light source arrangement. Moreover, each column captures the specular variation with respect to a single light source for non-Lambertian points. The pixels in the same row of MX are generated from data from cameras on different rings but at the same camera radial angle. To obtain the MSS-Cams, rays are traced from the point X to each camera in the CMSLF image capturing system 100. For a pixel (i,j) in the $M_X$, the ray is sampled from the camera at (s(i,j), t(i,j)). Based on Eqn. 3, the intensity at an MSS-Cam pixel $M_X(i,j)$ is:

$$M_X(i, j) = k_d \left( \frac{L_j \cdot N}{\|P_j - X\|^2} \right) cB_j E_j Q_j + k_s \left( \frac{(D_j \cdot V_{i,j})^\alpha}{\|P_j - X\|^2} \right) JE_j Q_j \quad (4)$$

where $V_{i,j}$ is the viewing direction from X to the camera (s(i,j), t(i,j)); $D_j$ is the reflection direction of $L_j$; $cB_j=R$ indicates the linear decomposition of the reflectance spectra R, with $c=[c_1, \ldots, c_w]$ as the reflectance coefficient vector and $B_j$ as a w×h linear reflectance basis matrix under the spectral range $[\lambda j-((h-1)/2)\lambda^-, \lambda j+((h-1)/2)\lambda^-]$. $E_j$ and $Q_j$ have the same spectral range and have sizes h×h and h×1, respectively.

Specularity Analysis

A specularity analysis may be performed on the MSS-Cam to show that the specularity variation across views exhibits a unique single-peak pattern that is useful for specular region depth estimation.

Diffuse and specular points may be separated by a thresholding operation, which distinguishes diffuse and specular points based on the intensity variance because the diffuse points have constant reflectance across views. FIG. 4 shows that the MSS-Cam sampled at the more correct scene depth exhibits photo consistency for diffuse points (same or substantially same intensities for pixels at the same column) and smooth intensity variations for specular points. If the MSS-Cam is sampled at an incorrect depth, rays are integrated from different surface points. This results in random fluctuation of intensities in the MSS-Cam. The photo consistency for diffuse points in an MSS-Cam image MX can be formulated as:

$$C(M_X) = \frac{1}{m} \sum_{j=1}^{m} std(M_X(1, j), \ldots, M_X(n, j)) \quad (5)$$

where std(•) is the standard deviation function. The standard deviation for pixels taken from the same column are closer to 0 than a threshold if the point is diffuse and the MSS-Cam $M_X$ is sampled at the correct depth. Therefore, if $C(M_X)$ of a point is greater than the threshold, the point is specular, and if the $C(M_X)$ of the point is less than the threshold, the point is diffuse.

Figure 5A:
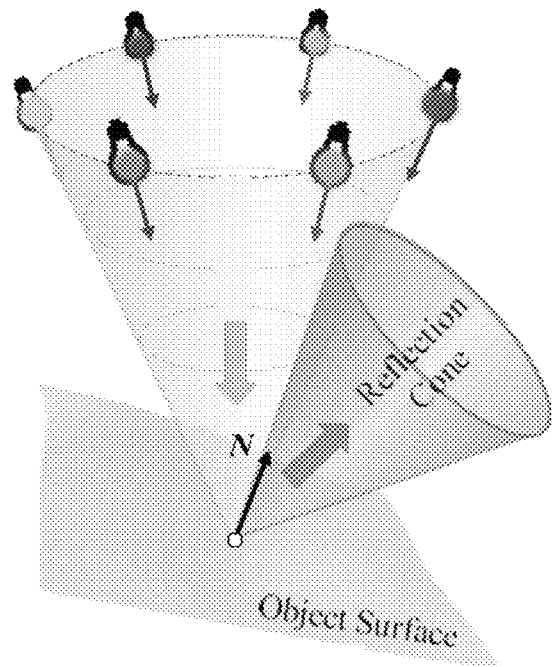
FIGS. 5A-5E illustrate certain aspects of MSS-Cams.

As shown below, for specular points, the specularity variation across views exhibits a unique single-peak pattern at least partly because of the concentric configuration of the specular cameras. As shown in FIG. 5A, the cone-shaped lighting directions from each point result in a reflection cone that is symmetric to the normal. Since the light field camera sampling for each spectrum is on a circle, the intensities from each column of the MSS-Cam changes sinusoidally with a single peak, where the each camera's sampling angle φ is from 0 to 2π in the circle (see FIG. 5B).

Figure 5B:
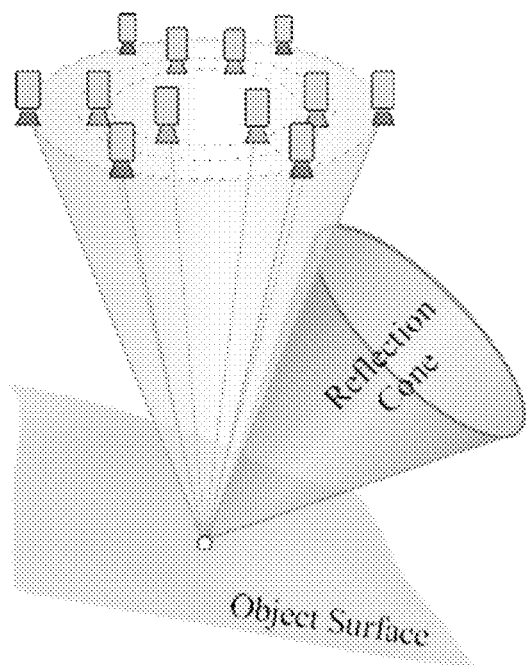
Figure 5C:
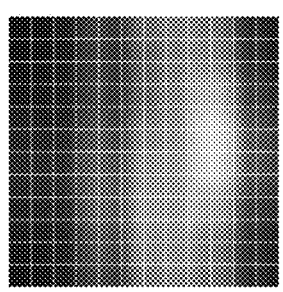
Figure 5D:
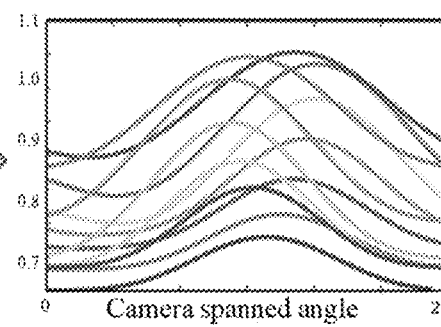
Figure 5E:
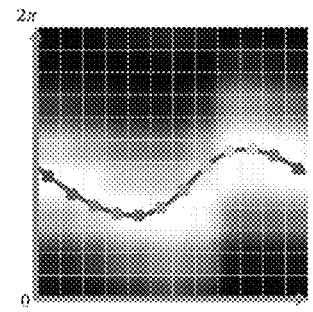

FIG. 5C illustrates an MSS-Cam with specularity. FIG. 5D illustrates pixel intensities form a column of the MSS-Cam indicating a single peak for each column. FIG. 5E illustrates that spanned angles corresponding to the peaks of each column form a sinusoidal curve.

Below the single peak property is formalized as a proposition and a proof. Proposition 1. The specularity variation along a column of a MSS-Cam always forms a single-peak function.

Proof.

For simplification, we consider a specular point in 3D, X=[0, 0, z], with the surface normal N. Its MSS-Cam $M_X$ sampled at a correct scene depth can be formulated by applying Eqn. 4. Now we analyze the intensity variation along the jth column of its MSS-Cam under the spectral light source j at $P_j=[r_1 \cos \theta_j, r_1 \sin \theta_j, 0]$. Assuming the normalized lighting direction is L, and the reflection direction w.r.t. the surface normal is $D=[d_x, d_y, d_z]$. The camera position from the camera ring is $[r_j \cos \varphi, r_j \sin \varphi, 0]$. The viewing direction can be computed as $V=[r_j \cos \varphi, r_j \sin \varphi, -z]/\sqrt{r_j^2+z^2}$. The diffuse component and the term $k_s JE_j Q_j/\|P_j-X\|^2$ in the specular component in Eqn. 4 are constants $c_d$ and $c_s$ along the jth column of the MSS-Cam, therefore, the intensity along the jth column of the MSS-Cam can be rewritten as:

$$I(\phi) = c_d + c_s (D \cdot V)^\alpha \quad (6)$$
$$= c_d + \frac{c_s}{(r_j^2 + z^2)^{\frac{\alpha}{2}}} (r_j d_x \cos\phi + r_j d_y \sin\phi - z d_z)^\alpha$$
$$= c_d + \frac{c_s}{(r_j^2 + z^2)^{\frac{\alpha}{2}}} (c_v \sin(\phi - \tilde{\phi}) - z d_z)^\alpha$$

where $$c_v = \sqrt{(r_j d_x)^2 + (r_j d_y)^2}$$

$$\sin\tilde{\phi} = \frac{d_x}{\sqrt{d_x^2 + d_y^2}}, \cos\tilde{\phi} = \frac{d_y}{\sqrt{d_x^2 + d_y^2}}$$

The terms cd and $$\frac{c_s}{(r_j^2 + z^2)^{\frac{\alpha}{2}}}$$

are constants along each column of the MSS-Cam.

Therefore, we can see that the intensity variation along a column of the MSS-Cam is an exponential sinusoidal curve w.r.t. the camera's angle φ in the ring, which is a single-peak function in the interval of [0, 2π].

Notice that the proposition will not be affected by the arrangement of the spectral light sources. The spectral arrangement results in different shape of the curve because it changes the column ordering, but the curve always remains one period of a sinusoid. Further, since the $\sin^n$(•) can be expanded as the Fourier series, we can approximate Eqn. 6 as a Fourier series w.r.t. the camera's angle φ in the ring as:

$$I(\phi) \approx F(\phi) = a_0 + \sum_p a_p \cos p\phi + \sum_p b_p \sin p\phi \quad (7)$$

We therefore fit a set of Fourier series $F_1, \ldots, F_m$ to model intensity variation of specular point per column in the MSS-Cam $M_X$. On the other hand, as is shown in FIGS. 5B and 5E, by taking the camera spanned angles corresponding to the peaks from each specularity curve, we can form a similar sinusoidal curve. We then fit another Fourier series $F_0$ to represent this curve of peak camera angles. Therefore, if a point is specular, its intensity in MSS-Cam should follow the consistency measurement below:

$$S(M_X) = \frac{1}{m}\sum_{j=1}^{m} \|U(j) - F(j)\| + \|\Phi - F(0)\| \quad (8)$$

where $U(j)=[M_X(1,j), \ldots, M_X(n,j)]$ are MSS-Cam pixels from the same column, $F(j)=[F_j(\varphi_1), \ldots, F_j(\varphi_n)]$ is the fitted Fourier series for this column. $\Phi=[\varphi_s^{(1)}, \ldots, \varphi_s^{(m)}]$ are camera spanned angles corresponding to the peaks from each column, and $F(0)=[F_0(1), \ldots, F_0(m)]$ is the Fourier series fitted for them.

Shape and Reflectance Reconstruction

The CMSLF reflectance model and the specularity analysis may be applied on MSS-Cam for surface shape and reflectance reconstruction using for example, method 300 illustrated in FIG. 3.

For example, at 321, given a pixel (u,v) and its corresponding 3D point X(u, v, z) in the virtual center view at [0, 0, 0], photo-consistency measurements may be applied on the MSS-Cams with varying depths z of X to initialize its depth as:

$$z' = \underset{z}{\mathrm{argmin}}\, C(M_X) \quad (9)$$

Each point is classified as diffuse or specular by thresholding the intensity variance across views. If a point is specular or non-Lambertian, at 331, its depth is refined using Eqns. 8 and 10:

$$z' = \underset{z}{\mathrm{argmin}}\, S(M_X) \quad (10)$$

Note that, in some embodiments, Fourier series fitting is performed only for non-Lambertian points because the process is time consuming and applying it for all points may not be necessary.

For each non-Lambertian point, at 341, given its depth determined at 321 and/or 331 and its MSS-Cam, the specular component may be subtracted from its MSS-Cam to obtain a specular-free MSS-Cam for the point. For example, vertical gradients of the MSS-Cam may be calculated to remove the diffuse component in Eqn. 4 as follows:

$$\nabla M_X(i,j) = (M_X(i+1,j) - M_X(i,j)) \quad (11)$$

$$= k_s((D_j \cdot V_{i+1,j})^\alpha - (D_j \cdot V_{i,j})^\alpha)\frac{JE_jQ_j}{\|P_j - X\|^2}$$

By rearranging Eqn. 11, we have:

$$G_X(i,j) = \nabla M_X(i,j)\frac{\|P_j - X\|^2}{JE_jQ_j} \quad (12)$$

where $G_X(i,j) = k_s((D_j \cdot V_{i+1,j})^\alpha - (D_j \cdot V_{i,j})^\alpha)$.

Given the pre-calibrated term $JE_jQ_j$ and the lighting position $P_j$, for example, determined according to a calibration process, such as that discussed below, and the calculated gradients, the observed $\tilde{G}_X$ to optimize the surface normal N; specular reflectivity $k_s$ and surface roughness $\alpha$ simultaneously through the following objective function:

$$\underset{N,\alpha,k_s}{\mathrm{argmin}}\sum_{i,j} \|\tilde{G}_X(i,j) - k_s((D_j \cdot V_{i+1,j})^\alpha - (D_j \cdot V_{i,j})^\alpha)\| \quad (13)$$

where $D_j=2(L_j\cdot N)N - L_j$. As this optimization is non-linear, the Levenberg-Marquardt method may be used to solve the specular parameters that satisfy the specularity gradient variations.

Given the specular parameters, the specular components can be subtracted from the MSS-Cam to form a specular-free MSS-Cam $A_X$ as:

$$A_X(i,j) = M_X(i,j) - k_s\left(\frac{(D_j \cdot V_{i,j})^\alpha}{\|P_j - X\|^2}\right)JE_jQ_j \quad (14)$$

A row vector may be formed as follows: $A_X=[\mathrm{median}(A_X(:,1)), \ldots, \mathrm{median}(A_X(:,m))]$ by taking the median values from each column of $A_X$.

At 351, a multi-spectral photometric stereo process is applied on the specular-free MSS-Cam $A_X$ to obtain a more accurate surface normal and reflectance. An objective function is formulated as:

$$\underset{N,c}{\mathrm{argmin}}\left((cW)\circ(LN)^T - A_X\right) \quad (15)$$

where $\circ$ is Hadamard product (element-wise multiplication), $L=[L_1; \ldots; L_m]$. The term $W=[W_1, \ldots, W_m]$ where $W_i=B_jE_jQ_j$, which is composed of the pre-calibrated camera and light source spectral responses. When the number of sampled spectra is greater than or equal to the dimensions of the reflectance spectra, that is w×3 is less than or equal to m, the above optimization can be formulated as an overdetermined linear system. We can write the following linear system by unrolling the matrices in Eqn 15:

$$b = H\backslash A_X^T \quad (16)$$

where $$H = \begin{bmatrix} W(1,1)L(1,1) & W(1,1)L(1,2) & W(1,1)L(1,3) & \ldots & \frac{W(w,1)}{L(1,3)} \\ W(1,2)L(2,1) & W(1,2)L(2,2) & W(1,2)L(2,3) & \ldots & \frac{W(w,2)}{L(2,3)} \\ \vdots & & & & \\ W(1,m)L(m,1) & W(1,m)L(m,2) & W(1,m)L(m,3) & \ldots & \frac{W(w,m)}{L(m,3)} \end{bmatrix}$$

$$b = [c_1n_x, c_1n_y, c_1n_z, \ldots, c_wn_x, c_wn_y, c_wn_z]^T$$

The surface normal and reflectance coefficients can be directly derived from b. Otherwise, when w×3>m, the Levenberg-Marquardt algorithm may be applied to solve Eqn 15.

After recovering the surface normal, the depth estimation is updated through normal integration. The MSS-Cams may then be re-computed with the updated depths.

For multi-spectral reflectance estimation, a dense multi-spectral reflectance $R=c^l B$ may be fit using the estimated reflectance coefficients $c^l$, where B are the dense spectral sampling reflectance basis functions determined on the Munsell color sets, for example, as discussed in J. P. Parkkinen, J. Hallikainen, and T. Jaaskelainen, "Characteristic spectra of munsell colors," JOSA A, vol. 6, no. 2, pp. 318-322, 1989; and L. T. Maloney, "Evaluation of linear models of surface spectral reflectance with small numbers of parameters," JOSA A, vol. 3, no. 10, pp. 1673-1683, 1986, which are incorporated herein by reference.

Example System

System Configuration

Figure 6B:
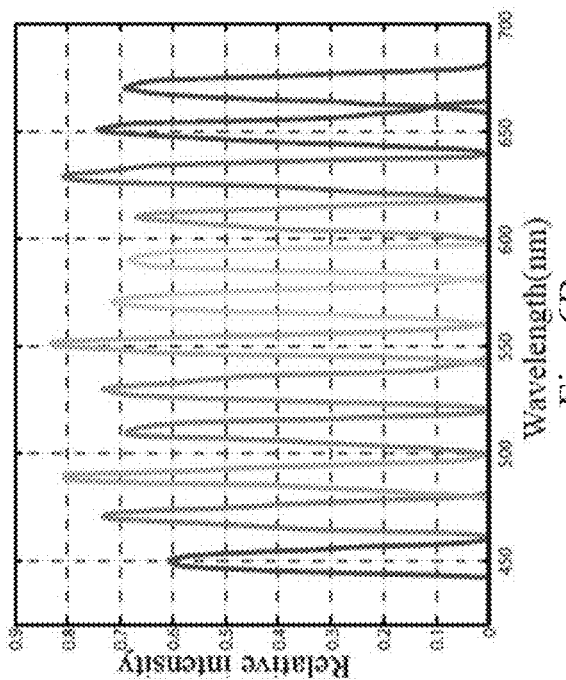
FIGS. 6A-6C illustrate certain aspects of an CMSLF image capturing system.
Figure 6C:
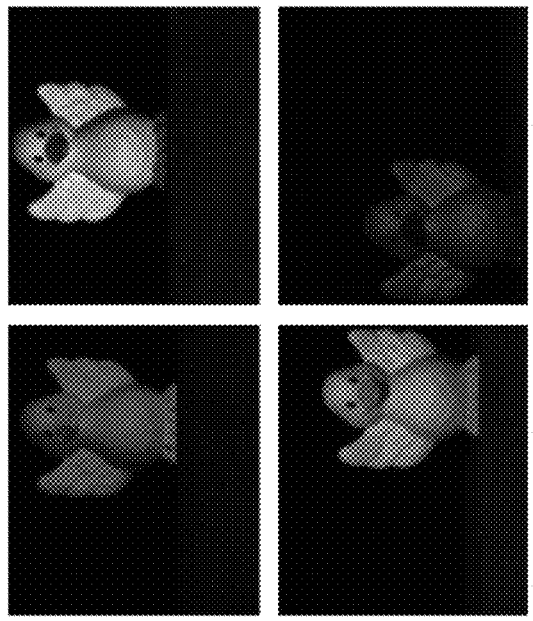
Figure 6A:
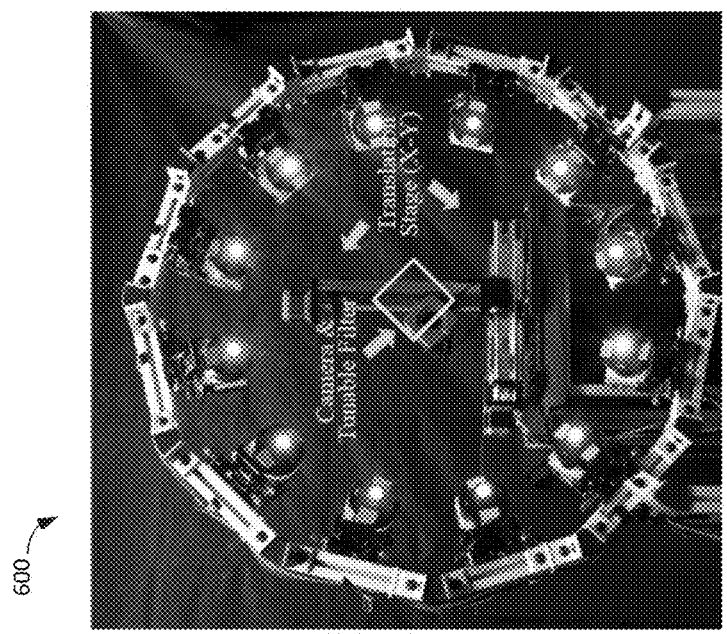

An embodiment of a CMSLF image capturing system 600 is illustrated in FIG. 6A. FIG. 6B illustrates relative intensity by wavelength of the light generated by CMSLF image capturing system 600. FIG. 6C illustrates four examples of spectral images captured by CMSLF image capturing system 600.

To implement the concentric multi-spectral light field camera array with a single camera, a monochrome camera (Point Grey GS3-U3-51S5M-C) with a 50 mm lens and a tunable liquid crystal spectral filter (KURIOS-WL1) in front of the camera is mounted on a translation stage to move the camera to specific positions on concentric circles on a 2D plane (the st plane). In this embodiment, a 12×8 concentric camera array (12 circles with 8 cameras on each circle) is implemented. The tunable liquid crystal spectral filter (KURIOS-WL1) in front of the camera enables the camera to capture the scene under specified wavelengths. The horizontal field-of-view of the camera is 13○ and the resolution of the captured image is 2448×2048.

In some embodiments, according to the dimensions of the system 600, the target is placed a target distance from the system 600. For example, the target distance may be equal to about 100 cm. In some embodiments, the target distance is equal or substantially equal to the radius of the light ring. In some embodiments, the target distance may be determined iteratively, for example, by comparing results obtained using various target distances, for example, with a test object or an object to be characterized with the system 600. For example, a linear or binary search algorithm may be used, as understood by those of skill in the art. In some embodiments, the results may, for example, include one or more of a qualitative or quantitative measurement of a reconstructed shape or reflectance of the object, a self-occlusion, and inter-reflection, where self-occlusion is or includes a qualitative or quantitative measurement of portions of the object which are occluded with respect to either or both of camera locations and the multi-spectral lights, and where inter-reflection is or includes a qualitative or quantitative measurement of light reflected from a first portion of the object to a second portion of the object and further to one or more camera locations. A target distance for which best results were obtained may be selected as the target distance for other objects. Other methods may be used to determine target distance.

Figure 7A:
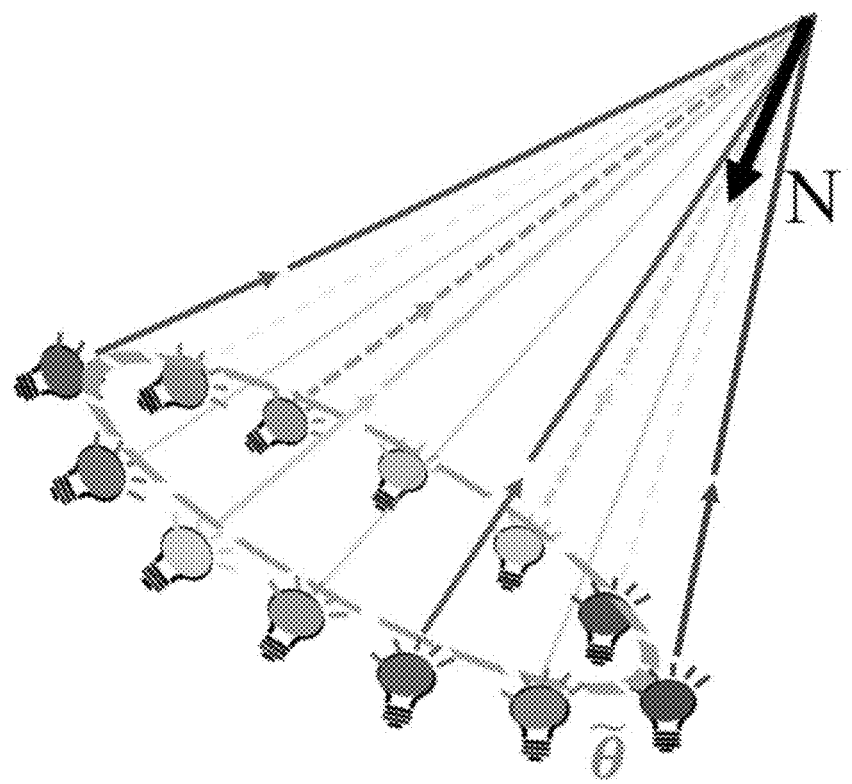
FIGS. 7A and 7B an arrangement of spectral filters of an CMSLF image capturing system.
Figure 7B:
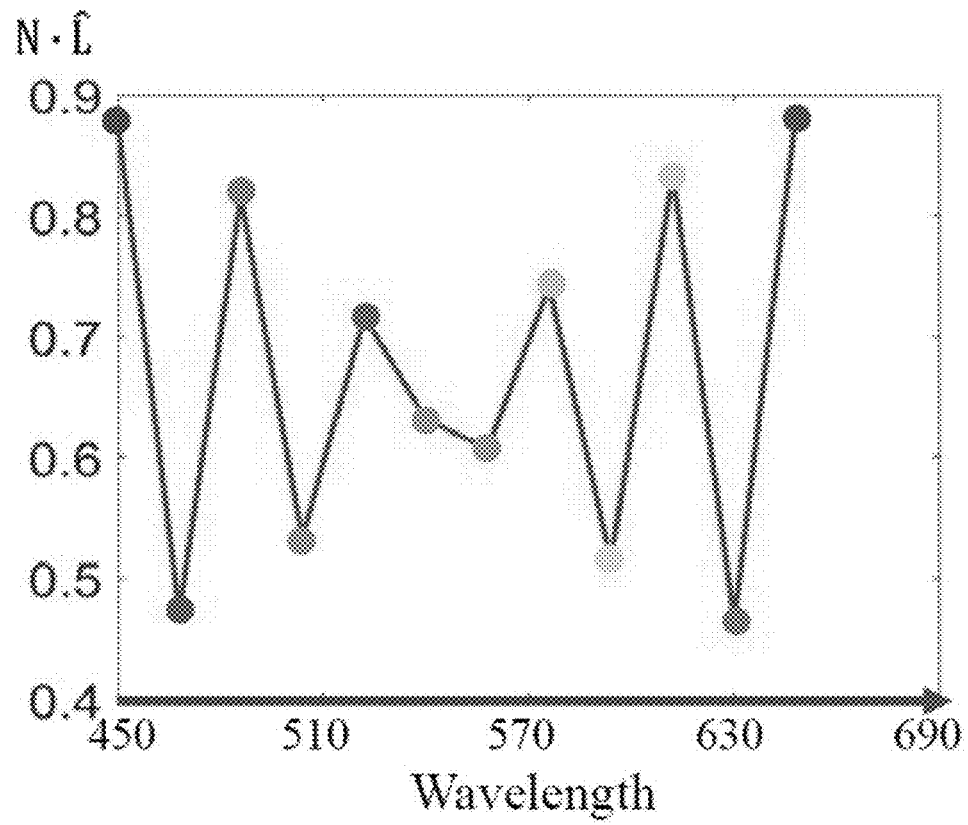

The multi-spectral ring light has twelve 30 Watt LED chips mounted onto a dodecagon frame, the distance between each LED chip and the center of the dodecagon is 50 cm. Twelve narrow-band spectral filters with wavelengths ranging from 450 nm to 670 nm with steps 20 nm are placed in front of the LED chips to cause the multi-spectral illumination. The spectral filters are arranged such that the shading variation along the illumination ring for a fluctuated curve with respect to the wavelength is as shown in FIGS. 7A and 7B. With this configuration, the ambiguity on reflectance and shading variation separation in Eqn. 15 is reduced. When the multi-spectral lights are arranged in this way, the surface normal can be more easily converged to the global optimum.

System Calibration

Geometric and photometric calibration may be performed on the system 600. For example, the camera intrinsics and extrinsics, the light sources' 3D positions, and spectral responses may be calibrated. The reflectance basis functions and camera spectral response may also be pre-computed in the calibration process.

Camera Calibration

The camera intrinsic and extrinsic parameters may, for example, be calibrated using a traditional camera calibration method, such as that discussed in Z. Zhang, "A flexible new technique for camera calibration," IEEE Transactions on pattern analysis and machine intelligence, vol. 22, 2000, which is incorporated herein by reference. Other methods may also be used.

Light Source Calibration.

The camera is then moved to specific positions on concentric circles with a high-precision 2D translation stage to calibrate the light source positions. For example, the camera may be firstly moved to the center of the concentric circle. For each light source, a sequence of images are captured with a chrome ball at different locations. In each image, the specular spot on the chrome ball is detected as an incident point. The incident ray direction is detected or calculated using the reflection ray direction (the camera ray) and the surface normal. The light source position can then be determined by backtracing all incident rays from the image sequence to form an intersection point. This procedure is repeated for each light source. In some embodiments, the images for all light source may be captured in one pass through spectral-multiplexing.

Spectral Calibration.

The mixed spectral response $W_j = B_j E_j Q_j$, where $E_j$ is the light source's spectral response and $Q_j$ is the camera's spectral response, is calibrated by capturing images of a standard colorchecker chart for each spectral light. As the ground truth reflectance response of the color swatches is known, a principle component analysis (PCA) operation can be performed to extract the coefficient vector for each color and combine them together to a coefficients matrix $C=[c_1; \ldots ; c_{24}]$ with size 24×w, where 24 is the total number of color swatches. The dense spectral reflectance basis B can be calculated. For the jth spectral light source, the tunable spectral filter in front of the camera is adjusted to capture the color checker only under a particular specific spectrum. With the known checker position and the light position, the shading term $(L_j \cdot N)/\|P_j - X\|^2$ is eliminated. We then average the intensities without shading components for each color swatch to form a vector $I^r$ with size 24×1. Wj is found by optimizing the following objective function:

$$\underset{W_j}{\mathrm{argmin}}(CW_j - I'_j) \qquad (17)$$

This optimization is performed for all spectra to obtain $W=[W_1, \ldots, W_m]$. Each spectral response $E_j Q_j$ can then be computed from the calculated $W_j$ with the known reflectance responses.

Figure 8:
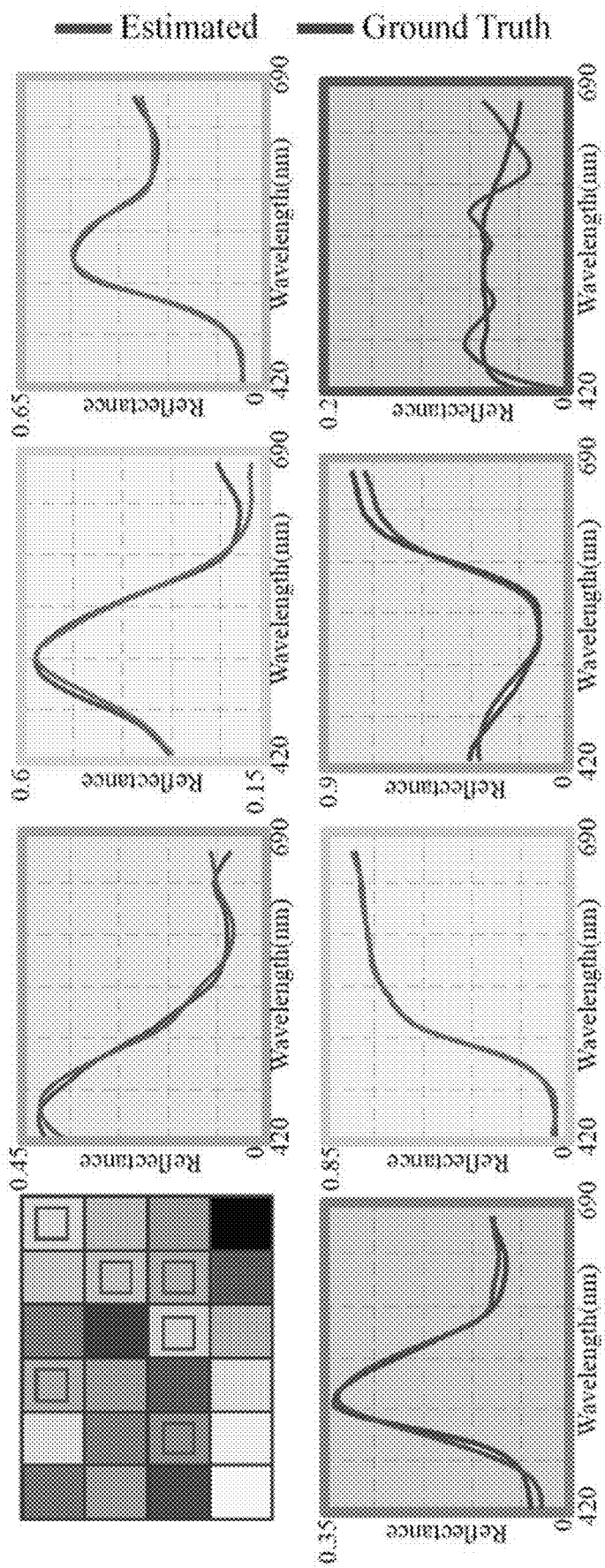
FIG. 8 illustrates spectral calibration results according to an embodiment.

The spectral calibration may be evaluated by comparing the estimated spectral responses for the colorchecker chart with the ground truth expected responses. The results of the spectral calibration are shown in FIG. 8 for each of seven light colors. The results show that the spectral estimations are highly accurate. The estimation accuracy is lower for the dark gray checkers because their captured intensities are low, resulting in low signal-noise ratio in the captured images.

Figure 9:
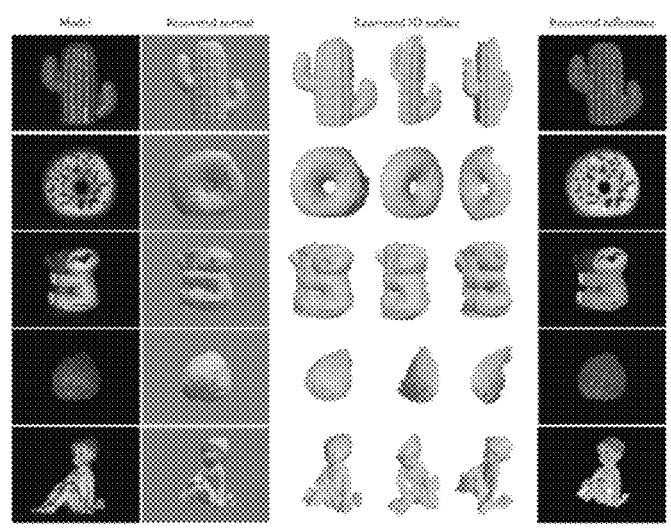
FIG. 9 illustrates surface and reflectance maps calculated using an CMSLF image capturing system.

FIG. 9 illustrates surface and reflectance maps calculated using the system 600 for the illustrated models.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A concentric multi-spectral light field (CMSLF) image capturing system, comprising:
   a center point location;
   a circular light source ring, wherein the circular light source ring is centered on the center point location, wherein a plurality of light sources are each placed on the circular light source ring, wherein the light sources are equally spaced apart, and wherein each of the light sources is configured to emit light in one of a plurality of different spectral bandwidths;
   a plurality of circular camera rings, wherein each circular camera ring is centered on the center point location, wherein each circular camera ring comprises a plurality of camera locations, wherein the camera locations of each circular camera ring are equally spaced apart;
   one or more cameras configured to capture images of an object from each of the camera locations of each particular circular camera ring, wherein the images captured from the camera locations of each particular circular camera ring are captured in one of the different spectral bandwidths, and wherein the object is illuminated by the light sources of the light source ring while each of the images are captured; and a processor configured to receive image data representing the captured images from the one or more cameras and to generate shape and reflectance maps of the object based on the received image data, wherein generating the shape and reflectance maps of the object comprises:
generating Multi-spectral Surface Camera Representation (MSS-Cam) for each of a plurality of points of the object based on the received image data;
determining whether each point of the object is Lambertian; and
estimating a depth for each point of the object.

2. The CMSLF image capturing system of claim 1, wherein the camera locations of the circular camera rings are radially aligned.

3. The CMSLF image capturing system of claim 1, wherein the quantity of circular camera rings is equal to the number of different spectral bandwidths.

4. The CMSLF image capturing system of claim 1, wherein the quantity of light sources is equal to the number of different spectral bandwidths.

5. The CMSLF image capturing system of claim 1, wherein the quantity of circular camera rings is equal to the number of different spectral bandwidths, and wherein the quantity of light sources is equal to the number of different spectral bandwidths.

6. The CMSLF image capturing system of claim 1, wherein the quantity of circular camera rings is equal to the number of different spectral bandwidths, wherein the quantity of light sources is equal to the number of different spectral bandwidths, and wherein the quantity of camera locations of each circular camera ring is equal to the number of different spectral bandwidths.

7. The CMSLF image capturing system of claim 6, wherein the camera locations of the circular camera rings are radially aligned, and wherein the light sources are radially aligned with the camera locations of the circular camera rings.

8. The CMSLF image capturing system of claim 1, wherein generating the shape and reflectance maps of the object comprises subtracting a specular component from the MSS-Cams of non-Lambertian points to generate a specular-free MSS-Cam for each non-Lambertian point.

9. The CMSLF image capturing system of claim 8, wherein generating the shape and reflectance maps of the object comprises calculating a depth for each non-Lambertian point based on the specular-free MSS-Cam of each non-Lambertian point.

10. The CMSLF image capturing system of claim 9, wherein generating the shape and reflectance maps of the object comprises generating updated specular-free MSS-Cams for each non-Lambertian point based on the calculated depth for each non-Lambertian point.

11. A method of generating shape and reflectance maps of an object, the method comprising:
illuminating the object with a circular light source ring, wherein the circular light source ring is centered on a center point location, wherein a plurality of light sources are each placed on the circular light source ring, wherein the light sources are equally spaced apart, and wherein each of the light sources is configured to emit light in one of a plurality of different spectral bandwidths;
capturing images of the object with one or more cameras from each of a plurality of camera locations, wherein the camera locations are each on one of a plurality of circular camera rings, wherein each circular camera ring is centered on the center point location, wherein the images captured from the camera locations of each particular circular camera ring are captured in one of the different spectral bandwidths;
receiving image data representing the captured images from one or more cameras;
generating the shape and reflectance maps of the object based on the received image data wherein generating the shape and reflectance maps of the object comprises:
generating Multi-spectral Surface Camera Representation (MSS-Cam) for each of a plurality of points of the object based on the received image data;
determining whether each point of the object is Lambertian; and
estimating a depth for each point of the object.

12. The method of claim 11, wherein generating the shape and reflectance maps of the object comprises subtracting a specular component from the MSS-Cams of non-Lambertian points to generate a specular-free MSS-Cam for each non-Lambertian point.

13. The method of claim 8, wherein generating the shape and reflectance maps of the object comprises calculating a depth for each non-Lambertian point based on the specular-free MSS-Cam of each non-Lambertian point.

14. The method of claim 13, wherein generating the shape and reflectance maps of the object comprises generating updated specular-free MSS-Cams for each non-Lambertian point based on the calculated depth for each non-Lambertian point.

* * * * *